Oct. 19, 1926.
T. B. GRUNWELL
SIGNAL
Filed June 8, 1925    2 Sheets-Sheet 2
1,604,039
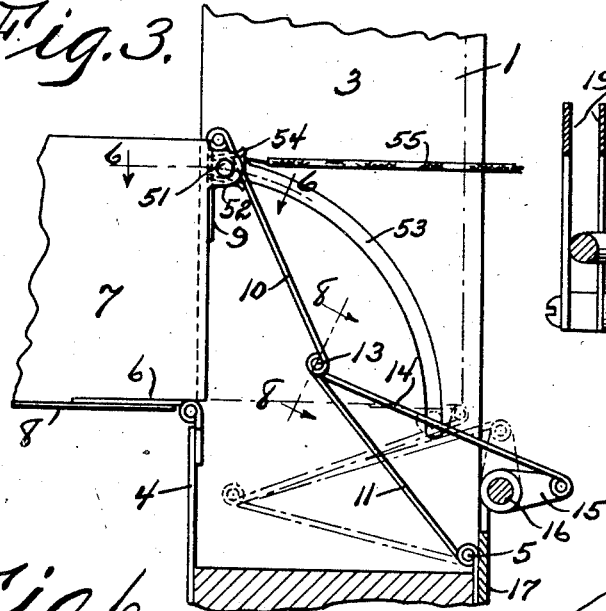
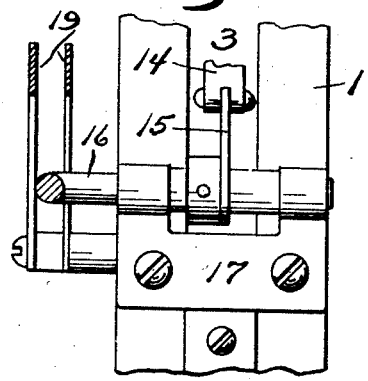
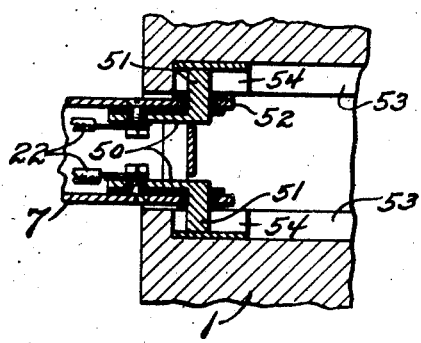
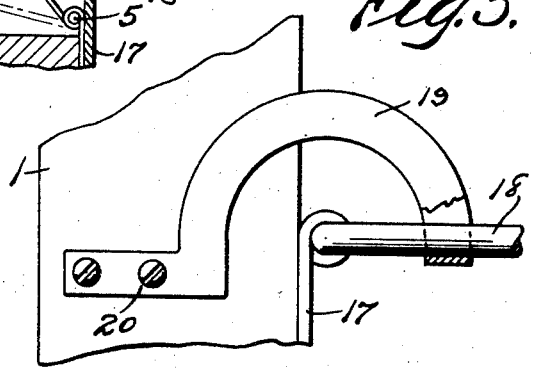
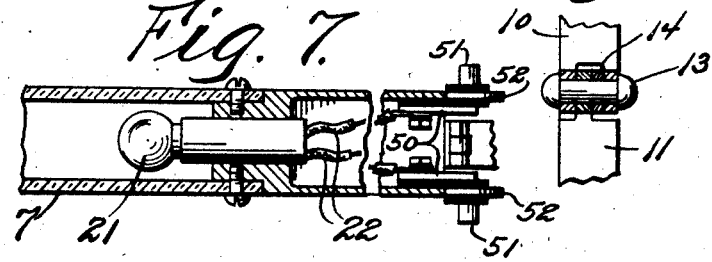
Thomas B. Grunwell
INVENTOR
BY Victor J. Evans
ATTORNEY
WITNESS Patented Oct. 19, 1926.

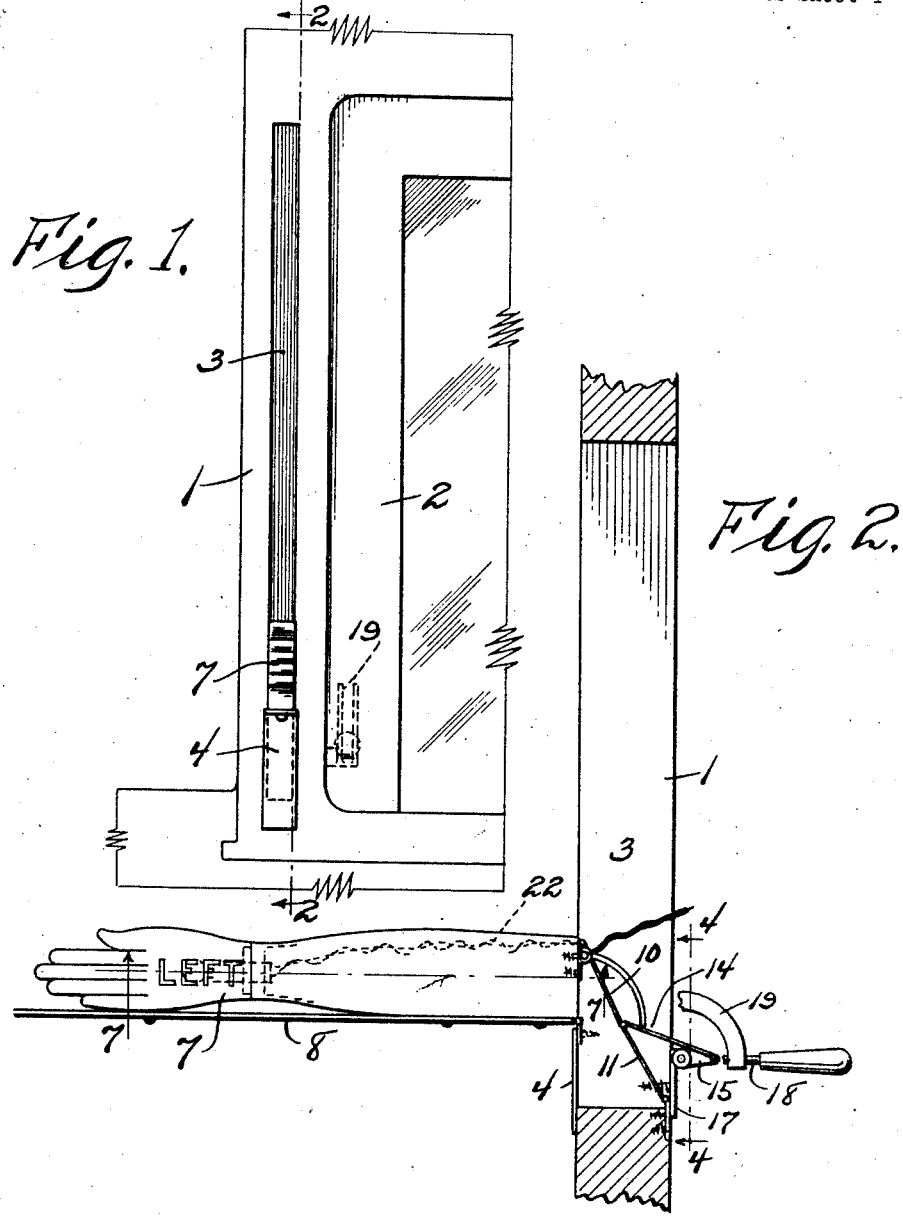

1,604,039

UNITED STATES PATENT OFFICE.

THOMAS B. GRUNWELL, OF WALLA WALLA, WASHINGTON.

SIGNAL.

Application filed June 8, 1925. Serial No. 35,729.

My present invention has reference to a signaling device for use in connection with automobiles.

An important object of the invention is the provision of a pivotally supported hand normally housed and concealed but swingable to an outward angle whereby a vehicle to the rear of that provided with the signal will be acquainted with the direction to be taken by said vehicle, and liability of collisions between the two vehicles will be thereby prevented.

A still further object is the provision of a directional signal in the nature of a pivotally supported arm which is normally housed at one side of the windshield of an automobile and which is provided with lever operated means of a novel construction for swinging the same to signaling position and retaining the said signal housed.

To the attainment of the foregoing and other objects which will present themselves, reference is to be had to the drawings which accompany and form part of this application, and wherein:

Figure 1 is an elevation of a portion of a closed car provided with the improvement.

Figure 2 is a sectional view on the line 2—2 of Figure 1, showing the signal arm swung to signaling position.

Figure 3 is a fragmentary enlarged sectional view through the housing for the signal arm, showing the arrangement of parts by full lines when the arm is swung to signaling position and by dotted lines when the arm is housed.

Figure 4 is a sectional view approximately on the line 4—4 of Figure 2.

Figure 5 is a side elevation of the construction disclosed in Figure 4, with parts broken away.

Figure 6 is a sectional view on the line 6—6 of Figure 3.

Figure 7 is a sectional view on the line 7—7 of Figure 2.

Figure 8 is a sectional view on the line 8—8 of Figure 3.

My improvement is preferably, but not necessarily designed for use in connection with closed cars and in the showing of the drawings the vertical jamb piece or stile 1 for a door or window 2 of a closed car is formed with a central longitudinal opening 3. This opening has its outer and lower portion partly closed by a plate 4. The plate partly covers the fixed leaf of a hinge 6. The hinge is secured to the outer edge of the signal arm 7. The outer edge of the signal arm has fixed thereon a metal strap or plate 8 of a greater width than that of the arm 7. This plate prevents the entrance of moisture to the housing provided by the opening 3.

Fixed on the inner and free end of the arm 7 there is a plate 9. Hinged to the outer end of the plate 9 there is secured a loop 10. Hingedly connected to the free end of the link 10 there is a second link 11. This link is hingedly secured, as at 5, adjacent to the inner and lower portion of the housing. For distinction the hinged connection between the links 10 and 11 is indicated by the numeral 13 and hingedly secured to the said pivot 13 there is a connecting rod 14. The connecting rod 14 projects through the housing 3 and has its free end preferably bifurcated and preferably secured to a lug 15 on a shaft 16. The shaft is journaled in bearings on the ends of a substantially U-shaped plate or bracket 17. The shaft 16 has an offset end providing a handle 18, and this handle is received through an arched guide, comprising two connected plates 19. The plates constituting the guide have a straight end which is fixed, as at 20, to the inner face of the stile 1. The plates 19 are designed for frictional engagement with the handle 18 to hold the said handle from free movement.

The signal arm 7 is hollow and provided, adjacent to its outer end or the end thereof formed with the hand, with openings cut to represent letters, such letters spelling words, for instance, the word "Left." These openings are covered by a transparent plate and in the arm, opposite the said openings, there is mounted a lamp bulb 21. The conductors for the bulb are indicated by the numerals 22. Preferably, and as disclosed by Figure 7 of the drawings, the transparent portion of the signal arm is removably fixed to the arm proper, and the socket for the bulb passes through the reduced outer end of the fixed arm section. The handle portion 18 of the shaft is round in cross section and is in frictional engagement with the arched arms of the guide 19. This prevents accidental swinging of the shaft 16.

The conductors 22 are connected to metal conductors 50 that are secured on the sides but insulated from the hollow arm 7. The conductor plates 50 have offset ends in the nature of trunnions 51 which pass through suitable brackets 52 that extend from the arm 7. The brackets 52 are located near one corner of the arm, and the metal trunnions are insulated from the said brackets. The trunnions 51 travel in arcuate slots 53 in the side walls provided by the opening 3 in the stile 1. In the upper end of the arcuate slots 53 there are spring contacts 54, each comprising a pair of arched arms. These contacts are, of course, insulated from any metal adjacent thereto and have connected therewith the insulated conductor wire 55 that leads to the electric system of the automobile. Thus it will be noted that when the signal arm is swung to signaling position the bulb 21 will be lighted. When the signal arm is swung in a reverse direction the trunnions 51, traveling in the slots 53, serve as guides for the said arm, and when the arm is wholly received in the pocket provided therefor the trunnions will rest on the lower walls formed by the slots 53. In this manner it will be noted that the signal arm is both properly guided and supported in its signaling movements and when at rest.

It is believed the simplicity of my construction and the advantages thereof will be apparent to those skilled in the art to which such invention relates when the foregoing description is read in connection with the accompanying drawings, but it is to be understood that I do not wish to be restricted to the precise details herein mentioned and may make such changes therefrom as fairly fall within the scope of what I claim.

Having described the invention I claim:—

The combination with the side of an automobile having an opening therethrough providing a housing, a plate partly covering the outer wall of the housing, a signal arm hingedly secured to the plate and designed, when arranged in the housing to fully close the opening, said housing having its opposite walls provided with arcuate grooves, a pair of pivotally connected links, one of which being secured to the inner and lower wall of the housing, and the other to the corner of the signal arm opposite that hingedly connected with the housing, oppositely directed trunnions on the last mentioned portion of the arm received in the grooves, spaced spring members designed to frictionally engage the trunnions when the signal arm is swung to signaling position, a connecting rod at the joint between the links extending inwardly through the housing, a shaft, a fixed lug on the shaft to which the connecting rod is pivoted, an operating lever on the shaft, and an arched guide for the operating lever comprising spring plates which exert a pressure against the lever.

In testimony whereof I affix my signature.

THOMAS B. GRUNWELL.